June 27, 1933.  C. W. VOGT  1,915,634
PROCESS AND APPARATUS FOR TREATING MATERIALS
Filed Nov. 29, 1929
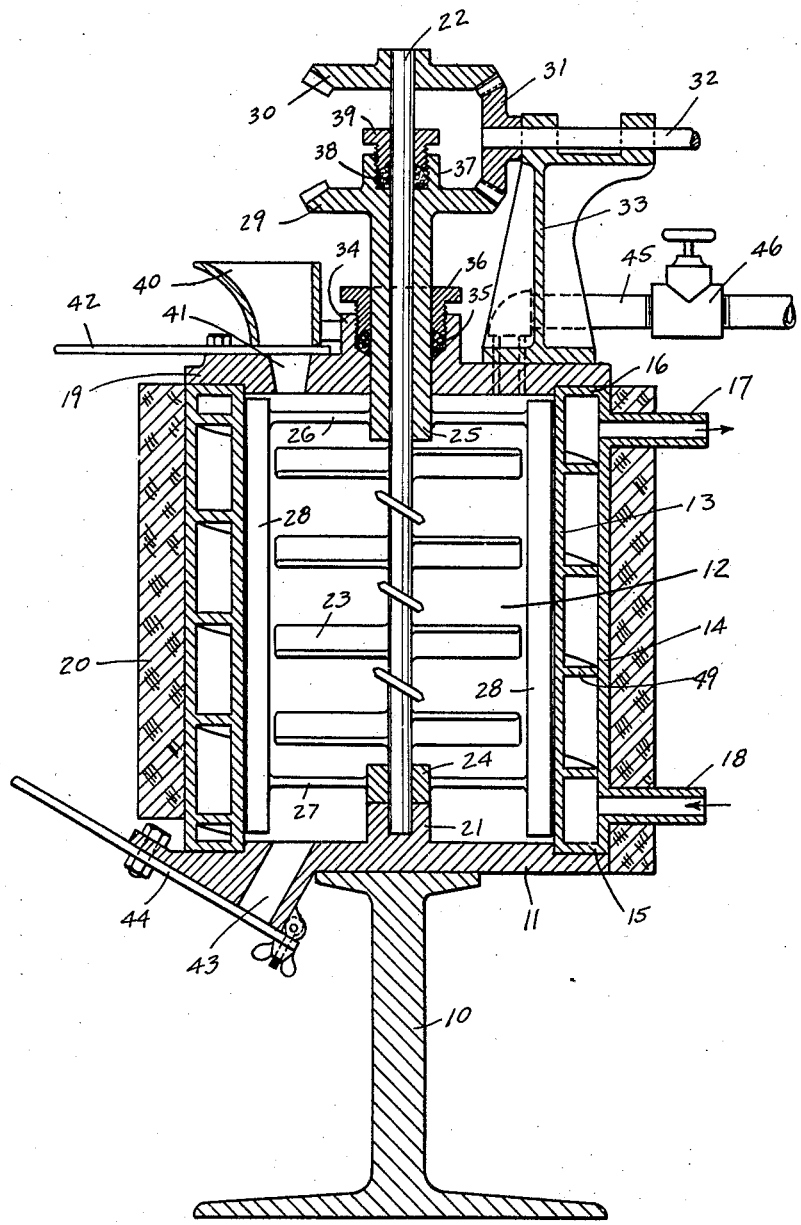
INVENTOR.
CLARENCE W. VOGT.
BY
Lockwood Lockwood Goldsmith & Galt
ATTORNEYS.

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION

PROCESS AND APPARATUS FOR TREATING MATERIALS

Application filed November 29, 1929. Serial No. 410,527.

This invention relates to a process and apparatus for treating materials, particularly applicable for processes wherein it is desired to increase the stiffness of a material within a processing chamber.

The principal object of the invention is to provide a process and apparatus whereby a batch of material may be treated to increase the stiffness to a higher degree than has been possible with previous processes and apparatus.

The principal feature of the invention whereby this result is obtained resides in the provision of means for removing the batch of material from the chamber when said material is stiffer than can be conveniently handled by means heretofore in use.

In the following specific description and the accompanying drawing, the invention is described as applied to the freezing of ice cream. However, this description is not intended to limit the invention to such use since it is applicable to the treating of many materials wherein the stiffness of a batch of material is to be increased. In the batch freezing of ice cream, it has been the practice heretofore to remove the frozen cream from the freezing chamber by means of gravity or by means of the screw action of the whipping blades in the chamber. The former means is only possible of use where the cream is frozen to so low a stiffness that it will flow by gravity. The latter means is objectionable because the continued beating of the cream during the removal causes the latter part of the batch to be brought to a different consistency than the first part and a uniform product is not obtained. The latter objection applies equally well to other products than ice cream wherein the beating or whipping of the material is an important factor in determining the final condition of the product.

In the present invention, the processing apparatus is constructed to withstand a hydraulic pressure. Stuffing boxes are placed about the protruding shafts to prevent the escape of material under pressure. The batch of material is treated to increase its stiffness and, when brought to the desired consistency, the pressure within the chamber is increased by the introduction of compressed air or other means, an outlet for the material is opened and the material is extruded through said outlet by means of the said pressure.

Other objects and features of the invention will be understood from the accompanying drawing and the following description and claims:

The figure shown is a central section through an ice cream freezer of the batch type to which the invention has been applied.

A support member 10 supports a plate 11 forming the lower end of a processing chamber 12. The side walls of the chamber 12 are formed by a cylindrical member 13 about which is placed a second cylindrical member 14. The ends of the said cylindrical members are joined together at 15 and 16 and the space therebetween is adapted to receive brine or other refrigerating agent. A refrigerant intake pipe 18 is used for the introduction of refrigerant to the said space and an outlet pipe 17 serves to remove the refrigerant therefrom. Helical fins 49 formed with the refrigerant space direct the refrigerant in a helical course about the chamber 12. The upper end of the chamber 12 is closed by means of a cover member 19 removably fastened to the upper end of the cylindrical members 13 and 14. The members 11, 13, 14 and 19 are fastened together by suitable means adapted to resist the desired hydraulic pressure to be applied within the chamber 12. A suitable insulating material 20 is applied to the outer surface of the cylindrical member 14 to prevent absorption of heat from the surrounding atmosphere.

The member 11 carries a step bearing 21 adapted to receive the lower end of a vertical shaft 22 in turn carrying whipping blades 23. Adjacent the bearing 21 a collar 24 is freely carried upon the said shaft. Adjacent the upper end of the shaft 22 a collar 25 surrounds the said shaft. The said shaft is free for relative rotation with respect to said collars. A plurality of arms 26 project from the collar 25 and arms 27 project from the collar 24. The arms 26 and 27 carry scraper blades 28 adjacent the inner surface of the cylindrical member 13. The shaft 22 and the collar 25 project through the cover member 19, the said cover member forming a bearing for the collar 25 and the collar 25 forming a bearing for the shaft 22.

The upper end of the collar 25 carries a bevel gear 29 and the upper end of the shaft 22 carries a reversely positioned bevel gear 30. A bevel pinion 31 carried on a shaft 32 engages both of the bevel gears 29 and 30. The shaft 32 is supported upon a bearing bracket 33 in turn carried upon the cover member 19. The said shaft may be rotated by any suitable power means such as an electric motor. The rotation of the said shaft causes rotation of the scraper blades 28 in one direction and the rotation of the whipping blades 23 in the opposite direction in a well known manner.

The cover member 19 is formed with an upwardly-projecting portion 34 adapted to receive suitable packing 35 surrounding the collar 25. A packing gland 36 likewise surrounds the collar 25 and is adapted to maintain the packing 35 in compressed condition to prevent escape of material from the chamber 12 when the said chamber is under pressure. The collar 25 is formed with an upwardly-extending portion 37 adapted to receive suitable packing 38. A packing gland 39 surrounds the shaft 22 and is adapted to maintain the packing 38 in compressed condition about the shaft 22, thereby preventing escape of material along the said shaft when the processing chamber 12 is under pressure.

An intake hopper 40 is carried upon the cover member 19 and communicates with a passage 41 in the said cover by which material may be introduced into the chamber. The passage 41 may be closed by an inlet gate 42. The member 11 is provided with a material outlet passage 43 which may be closed by an outlet gate 44. A pipe 45 is attached to the cover member 19 and is adapted to supply compressed air or other gas to the chamber 12. A valve 46 controls the passage of said gas therethrough.

In the operation of the apparatus and process, a mix of the material to be treated is introduced into the chamber 12 through the hopper 40 and passage 41, the discharge gate 44 being closed. The inlet gate 42 is then closed, refrigerant is supplied as heretofore described and the whipping blades and scraper blades are rotated until the material has reached the desired consistency. The whipping blades 23, in the manufacture of ice cream and similar products, serve to whip a desired quantity of air into the product, thus, in a large measure, determining the final condition of the product.

The outlet gate 44 is then opened and air under pressure is admitted to the chamber by means of valve 46. The pressure of air causes the extrusion of the product through the outlet passage 43. It is evident that by this means the freezing of ice cream or the processing of other materials may be carried to a greater stiffness than is possible when the material is not extruded under pressure. It is also evident that the pressure so applied bears equally upon all portions of the batch and will, therefore, cause no variations in consistency of different portions of the batch. The resulting product is, therefore, uniform throughout. In processes such as ice cream manufacture, the product is further hardened by being allowed to stand in a hardening compartment maintained at a very low temperature. By the process herein described, the cream may be frozen to a greater hardness within the processing apparatus and the time required for the final hardening is thereby greatly reduced.

In certain cases it is not necessary that the medium introduced for the extrusion of the product be a gas. Where no air is to be whipped into the finished product and the volume of the material does not greatly increase under the processing, the material to be processed may be forced in under pressure through the pipe 45. The pressure of the incoming material then serves to extrude the finished batch. In the manufacture of ice cream, the cream mix may be pumped in through the pipe 45 together with the proper amount of air to be whipped into the batch. The pressure of the mixture of the mix and air then serves to extrude the finished batch.

The invention claimed is:

1. The process of treating material including processing a batch of said material in a processing chamber to increase its stiffness to a point at which it does not readily flow by gravity or by gravity assisted by mechanical agitation, and thereafter extruding the same from said chamber under pressure greater than atmospheric pressure.

2. The process of making ice cream and other similar materials including the steps of refrigerating a batch of a mix of material in a processing chamber to increase its stiffness to a point at which it does not readily flow by gravity or by gravity assisted by mechanical agitation, and thereafter extruding the same from said chamber under fluid pressure.

3. The process of treating material including the steps of processing the same at substantially atmospheric pressure in a processing chamber to increase its stiffness to a point at which it does not readily flow by gravity or by gravity assisted by mechanical agitation, mechanically agitating the same during said processing and thereafter extruding the same from said chamber under fluid pressure.

4. The process of making ice cream and other similar materials including the steps of refrigerating a mix of materials in a processing chamber at substantially atmospheric pressure to increase its stiffness to a point at which it does not readily flow by gravity or by gravity assisted by mechanical agitation, mechanically agitating the same during the refrigerating operation, and thereafter extruding the same from said chamber under fluid pressure.

In witness whereof, I have hereunto affixed my signature.

CLARENCE W. VOGT.